| United States Patent [19] | [11] Patent Number: 5,075,272 |
| Martin | [45] Date of Patent: Dec. 24, 1991 |

[54] MIXED ACTIVATORS FOR STABILIZED METATHESIS CATALYSTS

[75] Inventor: Andrea E. Martin, Avondale, Pa.

[73] Assignee: Hercules Incorporated, Wilmington, Del.

[21] Appl. No.: 596,263

[22] Filed: Oct. 12, 1990

[51] Int. Cl.$^5$ .......................... B01J 31/00; C08F 4/42
[52] U.S. Cl. ..................................... 502/153; 526/183
[58] Field of Search ................ 502/102, 131, 132, 153

[56] References Cited

U.S. PATENT DOCUMENTS 4,729,976 3/1988 Sjardijn et al. ...................... 502/102
5,015,705 5/1991 Bell ..................................... 526/142

FOREIGN PATENT DOCUMENTS 63-234019 9/1988 Japan .

*Primary Examiner*—Joseph L. Schofer
*Assistant Examiner*—Wu C. Cheng
*Attorney, Agent, or Firm*—William S. Alexander; Joanne W. Patterson

[57] ABSTRACT

A metathesis catalyst activator composition consisting essentially of an alkoxyalkylaluminum halide and a tin compound in a molar ratio of about 0.15 to 2 moles of the alkoxyalkylaluminum halide per mole of tin compound.

7 Claims, No Drawings

MIXED ACTIVATORS FOR STABILIZED METATHESIS CATALYSTS

This invention relates to the polymerization of dicyclopentadiene or other polycyclic cycloolefin or mixtures thereof under the influence of a transition metal based ring-opening catalyst system. Specifically, it relates to a new catalyst activator system which exhibits a high degree of tolerance for air and moisture.

BACKGROUND OF THE INVENTION

Preparation of thermoset cycloolefin polymers via metathesis catalysts is a relatively recent development in the polymer art. Klosiewicz in U.S. Pat. Nos. 4,400,340 and 4,520,181 teaches a technique useful for preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, simultaneously, polymerization and molding to a permanently fixed shape take place.

In a system specifically taught by Klosiewicz, the ring-opening metathesis catalyst is based on tungsten hexachloride or tungsten oxytetrachloride. It is also known that the corresponding molybdenum compounds are effective ring-opening metathesis catalysts.

The tungsten or molybdenum catalyst is solubilized by complexing it with a phenolic compound so that a homogeneous catalyst/DCPD solution can be prepared. Also, in order to prevent premature ionic polymerization of the DCPD monomer in which the catalyst is to be dissolved, the catalyst component is stabilized by reacting it with a chelating agent or a Lewis base. Such chelants as acetylacetone, dibenzoyl methane, and alkylacetonates, or Lewis bases such as benzonitrile or tetrahydrofuran can be employed as the stabilizer. The chelants and, particularly, acetylacetone (2,4-pentanedione), are preferred stabilizers. Stabilization of the catalyst prevents ionic polymerization, giving the solution an almost indefinite shelf life in the absence of any activating mechanism taking place.

For a complete discussion of the preparation of such catalysts, reference can be made to Martin, U.S. Pat. No. 4,568,660.

Typically, the stabilized catalyst is activated with an alkylating agent possessing a high degree of Lewis acidity to strip off the stabilizing ligand. The most frequently used activators for this purpose are the alkylaluminum or alkylaluminum halides. It is also known to use a mixture of trialkylaluminum and dialkylaluminum halide. A preferred system is a mixture of di-n-octylaluminum bromide and tri-n-octylaluminum.

While these catalyst systems work very well and have been employed in formulations which have been used in virtually all market penetration made to data by polymers of polycyclic cycloolefins, they sometimes present handling difficulties due to their high degree of sensitivity to air and moisture. This is particularly true of the alkylaluminum halide activators. These formulations must be protected from the atmosphere at all stages of handling, shipping, storage and use up to the time of charging into the mold.

This difficulty has been recognized and addressed in the art by Sjardijn et al, U.S. Pat. No. 4,729,976. Sjardijn discloses a catalyst system employing an unstabilized $WCl_6$/phenol complex, activated by a trialkyl or triphenyl tin hydride. As also disclosed by Sjardijn, this activator is quite insensitive to oxygen and moisture and, as a result, need not be handled in an inert atmosphere. However, this system is not suitable for use with stabilized catalyst complexes as it is not capable of removing the stabilizing ligand from the tungsten. Further studies have indicated that other known tin compounds behave similarly.

BRIEF STATEMENT OF THE INVENTION

In accordance with this invention there has been found a ring-opening metathesis polymerization catalyst system including a mixed aluminum/tin activator which has a high degree of tolerance to oxygen and moisture but has sufficient Lewis acidity to strip away the stabilizing ligand from a stabilized tungsten or molybdenum salt catalyst component. Following removal of the stabilizing ligand, the tin compound is a very satisfactory activator.

Briefly stated the invention is a metathesis catalyst activator composition consisting essentially of a tin compound and an alkoxyalkylaluminum halide in a molar ratio of about 0.15 to 2 moles of alkoxyalkylaluminum halide per mole of tin compound.

DETAILED DESCRIPTION OF THE INVENTION

The activator system contemplated by this invention is made up of a tin compound which is a non-Lewis acid activator and a Lewis acid which is, at best, an extremely weak activator after its Lewis acid functionality is exhausted. In fact, Minchak, in U.S. Pat. No. 4,426,502 teaches the use of alkoxyalkylaluminum compounds as activators (referred to by Minchak as cocatalysts) in methathesis polymerization using ammonium alkyl molybdate or tungstate catalysts. This system is, by design, a very slow acting system seeking to take advantage of this very low activating action of the alkoxy alkylaluminums. For most commercial purposes, much faster action is required and for these applications, alkoxyalkylaluminums are not considered to be satisfactory activators.

In this invention, alkoxyalkylaluminum halides are employed as Lewis acids. Such compounds have the general formula (RO) R'Al where R is an alkyl radical having 1 to 18 preferably 2 to 4 carbon atoms, or a phenyl radical, R' is an alkyl radical having 1 to 18 preferably 2 to 4 carbon atoms, and X is a halide radical, preferably chloride or iodide. A particularly preferred species is ethyl, n-propoxyaluminum chloride $[C_2H_5(C_3H_7O)\text{-AlCl}]$. Other specific examples are ethylethoxyaluminum chloride, ethylisopropoxyaluminum chloride, methylethoxyaluminum chloride, propylethoxyaluminum chloride, ethylpropoxyaluminum iodide and ethylmethoxyaluminum iodide.

The tin compound of the mixed activator can be any tetravalent tin compound that is used with unstabilized tungsten or molybdenum salt-based activators such as, e.g. alkyltin hydrides, aryltin hydrides, tetraalkyltin compounds, hexaalkyl and hexaaryl di-tin compounds, and alkyltin halides. Alkyltin hydrides useful in this invention have the general formula $R_3\text{-Sn-H}$ where R is a straight or branched chain alkyl of 1 to 10 carbon atoms. The preferred embodiment is tributyltin hydride. The preferred aryltin hydride is the phenyl analog.

Tetraalkyltin compounds having 1 to 5 carbon alkyl substituents are well known for use as activators for olefin metathesis but are not effective with the stabilized tungsten and molybdenum salt catalyst systems. They are effective in combination with the alkoxyalkylaluminum halides of this invention. The preferred tetraalkyltins are tetramethyltin and tetrabutyltin.

Hexaaryl and hexaalkyl di-tin compounds have the general formula $$R_3\text{-Sn-Sn-}R_3$$

where R is a phenyl group or an alkyl group of 1 to 5 carbon atoms. The R substituents can be the same or different. Preferred examples of this embodiment are hexamethyl, hexabutyl or hexaphenyl di-tin.

The alkyltin halides that can be used in this invention have the general formula $$R_n\text{Sn}_{(4-n)}$$

where n is 1 to 3 and R and X are as defined hereinabove.

The operative ratio of the alkoxyalkylaluminum chloride to tetravalent tin compound is between about 0.15 and about 2. Below this range, the time required to cure dicyclopentadiene to a crosslinked, fully cured product is greater than is commercially practical. Above this range, the degree of polymerization falls off as demonstrated by increased levels of unreacted monomer in the resultant polymer.

The invention is of use in the polymerization of polycyclic cycloolefin monomers generally, and in particular, in the polymerization of such monomers in bulk, i.e., in the absence of solvent. Such monomers include, by way of example, dicyclopentadiene, higher cyclopentadiene oligomers norbornene, norbornadiene, 4-alkylidene norbornenes, dimethanooctahydronaphthalene, dimethanohexahydronaphthalene, adducts of these monomers with monocyclic cycloolefins and substituted derivatives of these compounds. The preferred cyclic olefin monomer is dicyclopentadiene or a mixture dicyclopentadiene with other polycyclic cycloolefin monomers in ratios of 1 to 99 mole % of either monomer, preferably about 75 to 99 mole % dicyclopentadiene.

The invention is illustrated in the following non-limiting examples. Parts and percentages, unless otherwise stated, are by weight.

In these examples, ethylpropoxyaluminum chloride (EPAC) was prepared by reaction of one equivalent of n-propanol with one equivalent of diethylaluminum chloride (DEAC). A nitrogen-sparged 4" polymerization tube, capped with an extracted rubber liner and equipped with a bubbler filled with mineral oil, was charged with 2.78 ml 1.8M DEAC in toluene. To this was added 6.85 ml dry toluene. Next was added 0.37 ml n-propanol (carefully by syringe), giving the rapid evolution of gas. Heat was also evolved. The solution was 0.5M in Al and was used without further manipulation.

In carrying out bulk molding by metathesis polymerization of crosslinking systems, two parameters are important. When the liquid streams are first mixed, a short induction time is observed, following which reaction begins and a rapid viscosity build-up takes place to a point at which the material becomes too viscous to be pumped to a mold. This time interval is known as the gel time. When the gel time is reached, the liquid must be in the mold. Shortly following gel time a very rapid temperature increase is observed as the remainder of the polymerization and the bulk of the crosslinking takes place. The time from mixing to attainment of 100° C. is arbitrarily taken as the polymerization time (cure time) although the temperature rise continues to 175° C. and higher.

GENERAL POLYMERIZATION PROCEDURE

Polymerizations were carried out in sparged 15×125 mm test tubes which were stoppered with rubber stopples secured with electrical ties. Disposable syringes and needles were sparged before use and used only once. For polymerizations with catalyst (B) and activator (A) components, the test tube was charged with 2.0 ml of the catalyst component. Next, a thermocouple attached to a digital thermometer was inserted. The desired starting temperature (33±2) was obtained by heating with a heat gun. Finally, 2.0 ml of the activator component was rapidly injected and a stopwatch was started. Mixing was accomplished by vigorous shaking. The gel time ($t_{gel}$, seconds) was taken at the time when the mixture ceased to flow readily upon inversion of the tube. The cure time ($t_{100}$, seconds) was taken as the time to 100° C., except for those polymerizations started at 50° C. and higher, where the time to 110° or 120° C. ($t_{110}$ or $t_{120}$) was sometimes used. (Since the rate of temperature rise is so rapid during the exotherm, there is very little difference in cure times regardless of which temperature is used.) The initial ($T_o$) and maximum temperatures ($T_f$) were recorded to calculate the exotherm ($T_{exo}$), i.e., the difference between $T_o$ and $T_f$.

EXAMPLE 1

In this example, polymerizations were carried out using tributyltin hydride (TBTH) as the catalyst activator. A 0.5M catalyst solution was prepared by slurrying one equivalent of $WCl_6$ in chlorobenzene under a nitrogen atmosphere. To this slurry were added, sequentially, 0.25 equivalent of t-butanol, 1 equivalent of 2,6-diisopropylphenol and 2 equivalents of acetylacetone (2,4-pentanedione). A soluble diisopropylphenol complex of mixed $WCl_6/WOCl_4$, stabilized to deactivate it as an ionic DCPD polymerization catalyst, resulted. The complex was dissolved in DCPD to form a 0.0074M tungsten concentration.

A series of activator solutions in DCPD was prepared having a standard TBTH concentration of 0.22M. To these were added varying amounts of ethylpropoxyaluminum chloride (EPAC).

Following the general polymerization procedure described above, a series of polymerizations was carried out using equal quantities of the catalyst and activator solutions. The ratio of tin to tungsten in the reacting mass was held constant at 3/1. The ratio of aluminum to tungsten was varied from 0.5 to 3.5 and the polymerization (cure) time was measured. Data from these runs are recorded in Table 1 as is also a control (std) run using, as the activator, a mixture of trioctylaluminum and dioctylaluminum iodide.

TABLE 1

| Al/W | $T_{exo}$ | $t_{100}$ | DCPD | % Swell |
|---|---|---|---|---|
| 0.5 | 180 | 207 | 1.51 | 52.1 |
| 1.0 | 177 | 118 | 0.93 | 53.4 |
| 1.5 | 188 | 72 | 0.75 | 57.1 |

TABLE 1-continued

| Al/W | T_exo | t_100 | DCPD | % Swell |
|---|---|---|---|---|
| 2.0 | 193 | 42 | 0.74 | 56.5 |
| 2.5 | 176 | 30 | 0.87 | 55.9 |
| 3.0 | 188 | 29 | 0.53 | 105.8 |
| 3.5 | 186 | 30 | 1.02 | 101.0 |
| std | 188 | 36 | 0.78 | 109.8 |

From the above, it can be seen that as the aluminum to tungsten ratio approaches 2, the cure time decreases to a practical point at which it thereafter remains essentially constant. It will be noted that this ratio is also the ratio of the acetylacetone to tungsten in the catalyst complex. From the table it can also be seen that little or no activation takes place with either TBTH or EPAC, used alone.

EXAMPLE 2

Using the same polymerization techniques, another series of polymerizations was carried out wherein the Al/-W ratio was held constant and the Sn/W ratio was varied. Here, cure times decreased with increasing tin concentration, but polymerization efficiencies decreased as tin concentration increased as evidenced by the residual DCPD in the polymer (column headed DCPD). Data are presented in Table 2.

TABLE 2

| Sn/W | T_exo | t_100 | DCPD | % Swell |
|---|---|---|---|---|
| 3/1 | 188 | 43 | 1.28 | 53.9 |
| 6/1 | 176 | 31 | 9.29 | 47.5 |
| 10/1 | 159 | 27 | 13.32 | 48.6 |
| 2/1 | 191 | 39 | 1.90 | 43.9 |
| 1/1 | 195 | 67 | 0.62 | 39.1 |

EXAMPLE 3

To demonstrate the tolerance to air of the mixed TBTH/EPAC activator system, a series of DCPD polymerizations was run, as in Example 1, wherein TBTH/EPAC activator solutions were initially treated with dry air at a level of about 0.25 mole of $O_2$ per mole of Sn. In these activator solutions the ratio of DCPD to TBTH was held constant at 1000/3 and EPAC concentration was varied. These were combined with a catalyst-containing component wherein the DCPD/tungsten ratio was held constant at 1000/1. Thus the reacting solution was DCPD/W/Sn at a ratio of 2000/1/3. Polymerizations were carried out via the general polymerization procedure described above. Results are presented in Table 3.

TABLE 3

| | Control | | 15 minutes* | | 72 hours* | |
|---|---|---|---|---|---|---|
| Al/Sn | t_100 | DCPD | T_100 | DCPD | t_100 | DCPD |
| 0.5 | 207 | 1.51 | 373 | 2.76 | 497 | 3.22 |
| 1.0 | 118 | 0.93 | 170 | 0.94 | 251 | 1.41 |
| 1.5 | 72 | 0.75 | 80 | 0.95 | 260 | 1.88 |
| 2.0 | 42 | 0.74 | 66 | 0.74 | 160 | 1.35 |
| 2.5 | 30 | 0.87 | 33 | 0.82 | 148 | 1.02 |
| 3.0 | 29 | 0.53 | 33 | 0.56 | 124 | 0.76 |
| 3.5 | 30 | 1.02 | 38 | 0.74 | 94 | 1.52 |
| std | 36 | 0.78 | 58 | 0.55 | >7200 | — |

*time after exposure to air

In the data presented above, the control is a run carried out using the activator prior to exposure to air. The "std" is a conventional activator containing no TBTH and no EPAC but, rather, containing DCPD/trioctylaluminum/dioctylaluminum iodide/diglyme at 1000/3 DCPD/Al ratio.

The improved resistance to air of the mixed activator is manifest.

COMPARATIVE EXAMPLES

In this example, experiments were performed that demonstrate the poor activation results obtained using EPAC or TBTH alone to activate a stabilized catalyst.

All polymerizations were carried out using catalyst prepared as in Example 1, except that the solvent was toluene and the phenol was nonylphenol in place of 2,6-diisopropylphenol. The final monomer (DCPD) to catalyst ratio was 2000/1. Polymerizations were done at an initial temperature of 33°+/−2° C., following the procedure of Example 1. Results are presented in Table 4 where the amounts of TBTH and EPAC are mole ratios relative to tungsten.

TABLE 4

| TBTH | EPAC | t_gel | t_100 | T_exo | % gel | % swell | % DCPD |
|---|---|---|---|---|---|---|---|
| 3 | 0 | | no gelation or polymerization | | | | |
| 3 | 3 | <5 sec | 130 | 180° C. | >100 | 57 | 2.47 |
| 0 | 3 | | no gelation or polymerization* | | | | |

*When heated to 75° C., this mixture polymerized in about one hour to give a polymer with swell 144% and residual monomer 0.62%.

In carrying out the process according to this invention, other processing refinements employed in the presently practiced commercial technique can be used. For example, additives to reduce the unreacted monomer content can be present. Also fillers and reinforcing aids can be added, as well as antioxidants and stabilizers.

These additives are added to the starting solutions, since at least in the case of DCPD they cannot be added after the solutions are polymerized. Such additives may be added in either the catalyst stream or the activator stream or both. The additives should be substantially unreactive with the catalyst or activator component in the solutions and they must of course have substantially no inhibitory action to polymerization. If a reaction between the additive and the catalyst component or the activator component is unavoidable, but does not essentially inhibit the polymerization, the additives can be mixed with the monomers to prepare a third solution, and the third solution can be mixed with the first and/or second solutions immediately before polymerization. When the additive is a solid filler having interstices between particles which can be filled sufficiently with the mixed solutions immediately before or during the polymerization reaction, the mold can be filled with the filler prior to charging the reactive solutions into the mold.

In order to decrease the residual monomer content, a small amount of an active halogen compound such as trichloromethyl toluene, dichlorodiphenyl methane, ethyl trichloroacetate, or isophthaloyl chloride or an acid anhydride such as benzoic anhydride may be added.

A variety of additives may be included in the formulations of the present invention to improve or to maintain characteristics of molded articles prepared therewith. Additives include fillers, pigments, antioxidants, light stabilizers, flame retardants, macromolecular modifiers and the like. The reinforcing materials or fillers used as additives can improve the flexural modulus of the polymer. These include glass fibers, mica, carbon black, wollastonite and the like.

The molded polymer prepared in the present invention should also contain an antioxidant in most cases. Preferably, a phenolic or amine antioxidant is added to the solutions prior to polymerization. Examples of the antioxidants include 2,6-t-butyl-p-cresol, N,N-diphenyl-p-phenylenediamine, and tetrakis[methylene(3,5-di-t-butyl-4-hydroxycinnamate)]-methane.

In some embodiments of this invention, a preformed elastomer which is soluble in the reactant streams is added to the metathesis-catalyst system in order to increase the impact strength of the polymer. The elastomer is dissolved in either or both of the reactant streams in an amount from about 3 to about 15 weight percent range, based on the weight of monomer. Illustrative elastomers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, ethylene-propylene-diene terpolymers and nitrile rubbers. The amount of elastomer used is determined by its molecular weight and is limited by the viscosity of the resultant reactant streams. The resultant reactant streams containing elastomer cannot be so viscous that mixing is not possible. Although the elastomer can be dissolved in either one or both of the streams, it is desirable that it be dissolved in both.

What is claimed is:

1. An activator composition for a stabilized metathesis catalyst system, said composition consisting essentially of an alkoxyalkylaluminum halide and a tin compound selected from the group consisting of alkyltin hydrides, aryltin hydrides, tetraalkyltin compounds, hexaalkyl and hexaaryl di-tin compounds and alkyltin halides, in a molar ratio of about 0.15 to 2 moles of the alkoxyalkylaluminum halide per mole of tin compound.

2. The composition of claim 1 wherein the tin compound is selected from the class consisting of trialkyltin hydrides, triaryltin hydrides and tetraalkyltin compounds.

3. The composition of claim 2 wherein the alkoxyalkylaluminum halide is ethylpropoxyaluminum chloride.

4. The composition of claim 3 wherein the tin compound is tributyltin hydride.

5. The composition of claim 1 which is dissolved in dicyclopentadiene in a concentration such that the molar ratio of components is about 1000 parts DCPD/one part tin compound/0.15 to 2 parts alkoxyalkylaluminum halide to form a reaction stream for use in reaction molding of dicyclopentadiene.

6. The composition of claim 5 wherein the tin compound is an alkyltin hydride and the alkoxyalkylaluminum halide is ethylpropoxyaluminum chloride.

7. The composition of claim 6 wherein the tin compound is tributyltin hydride.

* * * * *

UNITED STATES PATENT AND TRADEMARK OFFICE
CERTIFICATE OF CORRECTION

PATENT NO. : 5,075,272

DATED : December 24, 1991

INVENTOR(S) : Andrea E. Martin (Case 6)

It is certified that error appears in the above-identified patent and that said Letters Patent is hereby corrected as shown below:

Col. 3, line 21, "$R_nSn_{(4-n)}$" should read "$R_nSnX_{(4-n)}$".

Signed and Sealed this

Twenty-first Day of December, 1993

*Attest:*

BRUCE LEHMAN

*Attesting Officer*  *Commissioner of Patents and Trademarks*